(12) United States Patent
Stamm Masias et al.

(10) Patent No.: US 9,527,033 B2
(45) Date of Patent: Dec. 27, 2016

(54) MIXED METAL OXIDE CATALYST

(71) Applicant: Toyota Motor Engineering & Manufacturing North America, Inc., Erlanger, KY (US)

(72) Inventors: Kimber L. Stamm Masias, Ann Arbor, MI (US); Paul T. Fanson, Brighton, MI (US); Torin C. Peck, Ypsilanti, MI (US); Charles A. Roberts, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 173 days.

(21) Appl. No.: 14/604,135

(22) Filed: Jan. 23, 2015

(65) Prior Publication Data
US 2016/0214060 A1 Jul. 28, 2016

(51) Int. Cl.
*B01D 53/94* (2006.01)
*B01J 23/02* (2006.01)
*B01J 23/10* (2006.01)
*F01N 3/28* (2006.01)
*F01N 3/10* (2006.01)
(Continued)

(52) U.S. Cl.
CPC .......... *B01D 53/945* (2013.01); *B01J 23/002* (2013.01); *B01J 23/63* (2013.01); *B01J 23/8946* (2013.01); *F01N 3/101* (2013.01); *B01D 2255/1021* (2013.01); *B01D 2255/1023* (2013.01); *B01D 2255/1025* (2013.01); *B01D 2255/1028* (2013.01); *B01D 2255/2042* (2013.01); *B01D 2255/2065* (2013.01);
(Continued)

(58) Field of Classification Search
CPC . B01D 53/925; B01D 53/9445; B01D 53/945; B01D 2255/2042; B01D 2255/402; B01D 2255/2065; F01N 3/101
See application file for complete search history.

(56) References Cited

U.S. PATENT DOCUMENTS 4,849,398 A * 7/1989 Takada ................. B01D 53/945
423/213.5
6,528,195 B1 * 3/2003 Taniguchi ............... C04B 35/48
204/421
(Continued)

FOREIGN PATENT DOCUMENTS

CN 103086716 A * 5/2013 ............. C04B 35/50

OTHER PUBLICATIONS

Singh et al., "A Pd-doped perovskite catalyst, BaCe1-xPdxO3-?, for CO oxidation", Journal of Catalysis 249 (2007) pp. 349-358.
(Continued)

*Primary Examiner* — Timothy Vanoy
(74) *Attorney, Agent, or Firm* — Dinsmore & Shohl LLP

(57) ABSTRACT

A three-way catalytic material that reduces NOx in an oxidizing atmosphere and a process for reducing NOx in an oxidizing atmosphere. The material is a mixed metal oxide catalyst and can be made from a doped barium cerate matrix with a chemical formula of $BaA_yD_zCe_{(1-y-z)}O_{3-\delta}$, where A is a precious metal or a combination of two or more precious metals and D is at least one transition metal. The coefficient y has a value between 0.0 and 0.20, inclusive, and the coefficient z has a value between 0.0 and 0.20, inclusive, and $\delta$ has a value between 0.00 and 0.20, inclusive.

12 Claims, 3 Drawing Sheets

(51) Int. Cl.
  *B01J 23/63*  (2006.01)
  *B01J 23/89*  (2006.01)
  *B01J 23/00*  (2006.01)

(52) U.S. Cl.
  CPC ............. *B01D 2255/20753* (2013.01); *B01D 2255/40* (2013.01); *B01J 2523/00* (2013.01)

(56) References Cited

U.S. PATENT DOCUMENTS

| | | | |
|---|---|---|---|
| 8,383,544 B2 * | 2/2013 | Eckhoff | B01D 53/96 502/304 |
| 8,592,337 B2 | 11/2013 | Hilgendorff et al. | |
| 9,373,863 B2 * | 6/2016 | Irving | H01M 8/1016 |
| 2005/0020442 A1 | 1/2005 | Sermon et al. | |

OTHER PUBLICATIONS

Shimura et al., "Influence of the transition-metal doping on conductivity of a BaCeO3-based protonic conductor", Solid State Ionics 176 (2005) pp. 2945-2950.

Roy et al., "Catalysis for NOx abatement", Applied Energy 86 (2009) pp. 2283-2297.

* cited by examiner

MIXED METAL OXIDE CATALYST

FIELD OF THE INVENTION

The present invention is related to a mixed metal oxide catalyst material and in particular to a mixed metal oxide catalyst material that can reduce nitrogen oxides in an oxidizing environment.

BACKGROUND OF THE INVENTION

Three-way catalytic converters for motor vehicles are known. Such three-way catalytic converters control the emission of nitrogen oxides (NOx). Such three-way catalytic converters typically use a catalyst material that reduces nitrogen oxides to nitrogen and oxygen in the presence of a reductant gas ($H_2$, CO, or hydrocarbon); oxidizes carbon monoxide to carbon dioxide in the presence of an oxidizing gas: $2CO+O_2 \rightarrow 2CO_2$; and oxidizes unburnt hydrocarbons (HC) to carbon dioxide and water in the presence of an oxidizing gas: $C_xH_{2x+2}+[(3x+1)/2]O_2 \rightarrow xCO_2+(x+1)H_2O$.

The above reactions are known to occur most efficiently when a catalytic converter receives exhaust from an engine that is operated within a narrow band of air-to-fuel ratios near stoichiometry, such that the exhaust gas oscillates between slightly rich (excess fuel—reducing) and slightly lean (excess oxygen—oxidizing) conditions. Also, it is known that improved fuel economy occurs when fuel combustion occurs with excess oxygen, as seen in lean burn gasoline or diesel engines. Unfortunately, under lean engine operation, excess oxygen is present and the reduction of NOx is not favored.

Therefore, an improved three-way catalytic material that allows for the reduction of NOx in an oxidizing environment would be desirable. In addition, a process for reducing NOx in an oxidizing environment would also be desirable.

SUMMARY OF THE INVENTION

A three-way catalytic material for reducing NOx in an oxidizing atmosphere, and a process for reducing NOx in an oxidizing atmosphere, is provided. The three-way catalytic material includes a doped barium cerate matrix that has a chemical formula of $BaA_yD_zCe_{(1-y-z)}O_{3-\delta}$ where A is at least one precious metal and D is at least one transition metal. The precious metal can be any precious metal, for example palladium (Pd), platinum (Pt), iridium (Ir), rhodium (Rh), siliver (Ag) or gold (Au). Also, the transition metal can be any transition metal, for example titanium (Ti), chromium (Cr), manganese (Mn), copper (Cu) Yttrium (Y), iron (Fe), cobalt (Co) or nickel (Ni). The value for the coefficient y can be between 0.00 and 0.20, inclusive, preferably between 0.01 and 0.15, and more preferably between 0.05 and 0.125. Similarly, the value for the coeeficient z can be between 0.00 and 0.20, inclusive, preferably between 0.01 and 0.15, and more preferably between 0.05 and 0.125. Finally, the value for the coefficient δ can be between 0.00 and 0.20, inclusive.

The doped barium cerate matrix has an outer surface and the outer surface oxidizes carbon monoxide (CO) to carbon dioxide ($CO_2$), oxidizes unburnt hydrocarbons to $CO_2$ and $H_2O$, and reduces NOx to $N_2$ and $O_2$ in a combusted fuel plus air atmosphere that contains CO, unburnt HC, and NOx. In some instances, A is two or more precious metals. Finally, the outer surface can be free of metal nanoparticles, i.e. free of A nanoparticles and D nanoparticles, however this is not required.

The process for reducing NOx in not only a stoichiometric, but also an oxidizing atmosphere includes providing an inventive three-way catalytic material as described above. The three-way catalytic material is placed in the path of a combusted fuel plus air oxidizing atmosphere containing CO, unburnt HC, and NOx. As such, the combusted fuel plus air oxidizing atmosphere passes over an outer surface of the three-way catalytic material. Furthermore, the outer surface of the three-way catalytic material oxidizes the CO to $CO_2$, oxidizes the unburnt HC to $CO_2$ and $H_2O$, and reduces the NOx to $N_2$ and $O_2$ in the same fuel plus air oxidizing atmosphere. In this manner, a vehicle that produces the combusted fuel plus air oxidizing atmosphere can operate in the lean condition without the need to subject the three-way catalytic material to cyclic oxidizing-reducing environments. Also, operating the vehicle in the lean condition results in improved fuel economy.

DETAILED DESCRIPTION OF THE INVENTION

A three-way catalytic material that reduces NOx in both reducing and oxidizing atmosphere and a process for reducing NOx in an oxidizing atmosphere is provided. As such, the material and the process have use as a catalytic converter material for a vehicle. It is appreciated that the term "oxidizing atmosphere" refers to a gaseous atmosphere that has a level or amount of oxygen that is greater that the oxygen dictated by the stoichiometric ratio for a given gaseous environment.

The material is a mixed metal oxide catalyst and can be made from a doped barium cerate matrix that has a chemical formula of $BaA_yD_zCe_{(1-y-z)}O_{3-\delta}$. The symbol A is a precious metal or a combination of two or more precious metals selected from any precious metal, but preferably from Pd, Pt, Ir, and Rh. The symbol D is at least one transition metal selected from any transition metal, but preferably from Fe, Co and Ni. The coefficient y has a value between 0.1 and 0.20, inclusive, and the coefficient z has a value between 0.0 and 0.20, inclusive, and in some instances z has a value between 0.01 and 0.20, inclusive.

The three-way catalytic material naturally has an outer surface with a plurality of catalytic oxidation sites and a plurality of catalytic reduction sites. In this manner, the doped barium cerate can oxidize CO to $CO_2$, oxidize unburnt HC to $CO_2$ and $H_2O$, and reduce NOx to $N_2$ and $O_2$ in a combusted fuel plus air atmosphere. Therefore, a vehicle that employs the inventive material can operate under lean conditions for longer times than are allowed by current state of the art three-way catalytic materials.

The process for reducing NOx in the oxidizing atmosphere includes providing the three-way catalytic material and passing a predetermined combusted fuel and air mixture that contains CO, unburnt HC, and NOx over an outer surface of the material. In addition, the outer surface of the three-way catalytic material oxidizes the CO to $CO_2$, oxidizes the unburnt HC to $CO_2$ and $H_2O$, and reduces the NOx to $N_2$ and $O_2$ while being subjected to the same predetermined fuel plus air atmosphere.

Figure 1A:
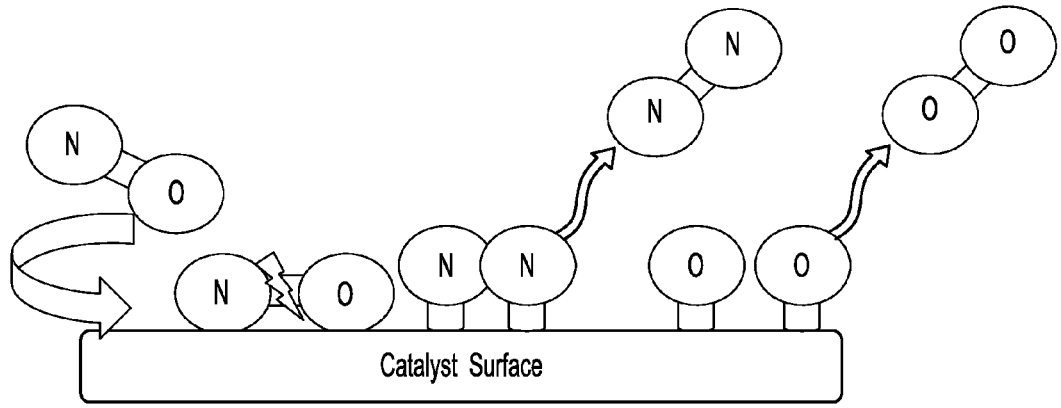
FIG. 1A is a schematic illustration of the reduction of NO to $N_2$ and $O_2$.
Figure 1B:
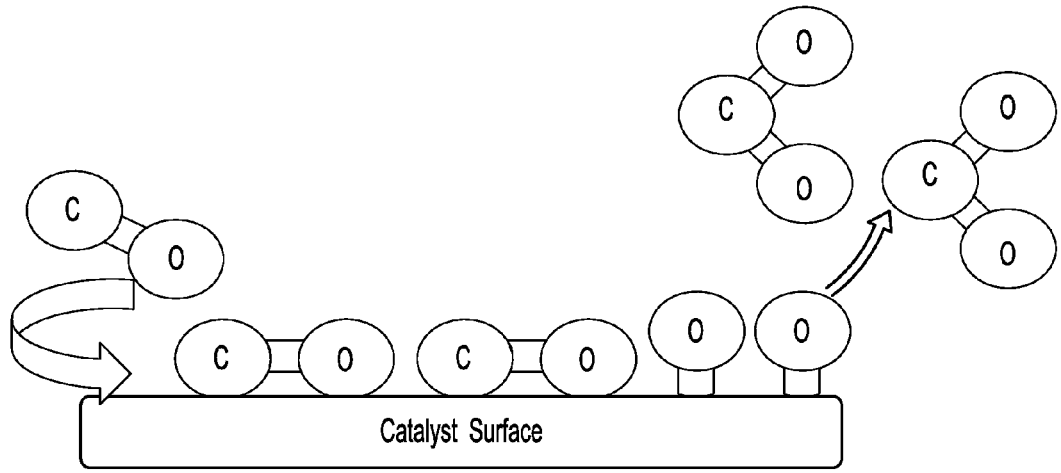
FIG. 1B is a schematic illustration of the oxidation of CO to $CO_2$.
Figure 1C:
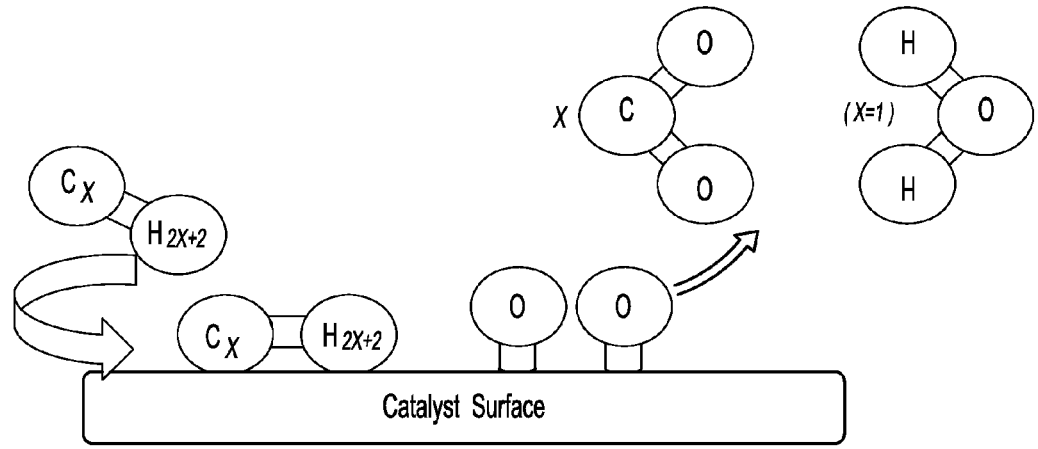
FIG. 1C is a schematic illustration of the oxidation of $C_xH_{2x+2}$ to $xCO_2$ and $(x+1)H_2O$.

Turning now to FIGS. 1A-1C, schematic illustrations are shown for the reduction of NOx, oxidation of CO and the oxidation of a hydrocarbon. In particular, FIG. 1A illustrates a NO molecule absorbed onto a catalyst surface, after which the bond between the nitrogen atom and the oxygen atom is broken. In addition, a pair of nitrogen atoms desorb from the catalytic surface and form an $N_2$ molecule, as does a pair oxygen atoms to form an $O_2$ molecule. In FIG. 1B, a pair of CO molecules are absorbed onto the catalyst surface and react with a pair of absorbed oxygen atoms to form a pair of desorbed $CO_2$ molecules. Finally, FIG. 1C illustrates a hydrocarbon ($C_xH_{2x+2}$) adsorbed onto the catalyst surface and then reacting with (3x+1)/2 oxygen atoms to form $xCO_2$ and $(x+1)H_2O$ desorbed molecules. In this manner, the doped barium cerate disclosed herein serves as a three-way catalytic material.

Figure 2:
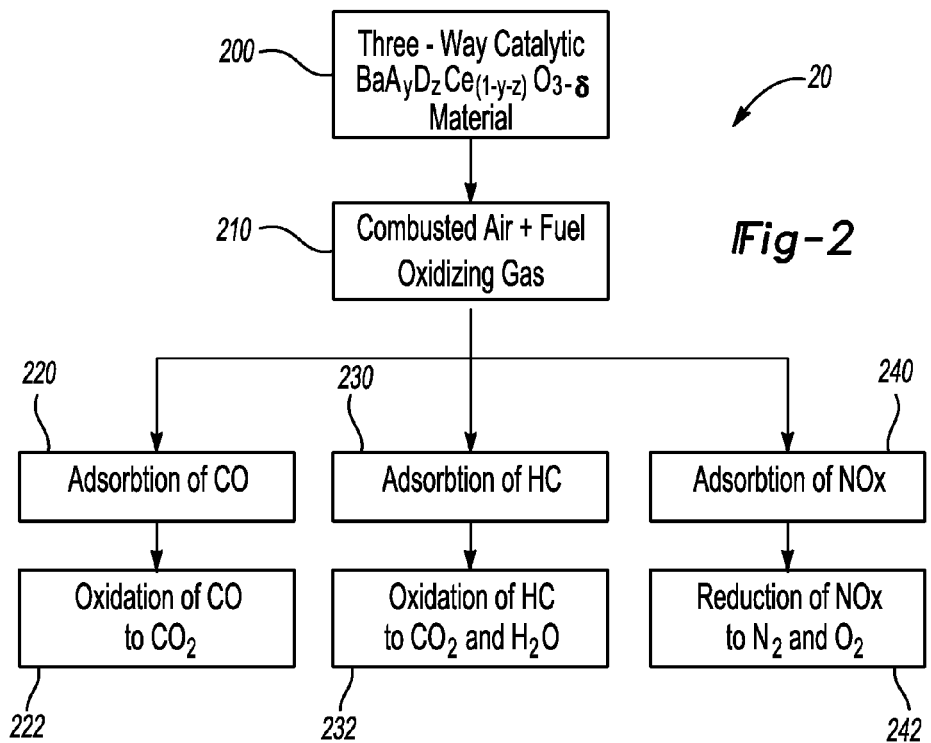
FIG. 2 is a schematic flowchart of a process according to an embodiment disclosed herein.

A process for reducing NOx to $N_2$ and $O_2$ in an oxidizing gas is shown in FIG. 2 at reference numeral 20. The process 20 includes providing a three-way catalytic doped barium cerate material at step 200 and also providing a predetermined combusted air plus fuel oxidizing gas at step 210. The predetermined combusted air plus fuel mixture is passed over the catalytic material such that adsorption of CO on the doped barium cerate material occurs at step 220, adsorption of unburnt HC occurs at step 230, and adsorption of NOx occurs at step 240. Thereafter, oxidation of CO to $CO_2$ occurs at step 222, oxidation of the unburnt HC to $CO_2$ and $H_2O$ occurs at step 232, and reduction of NOx to $N_2$ and $O_2$ occurs at step 242. In some instances, the CO oxidation catalytic sites and the HC oxidation catalytic sites are the same, or in the alternative, the CO and HC oxidation catalytic sites are different.

A number of doped barium cerate compositions were produced using standard laboratory techniques known to those skilled in the art and the samples were tested and compared to standard barium cerate and other well known three-way catalytic materials. For example, one test exposed different barium cerate doped samples in an atmosphere containing a stoichiometric mixture of nitric oxide, propylene, carbon monoxide, and oxygen (e.g., 1500 ppm NO, 1000 ppm $C_3H_6$, 6500 ppm CO and 7000 ppm $O_2$) at a predetermined temperature, and measured the NO and $O_2$ conversion for each sample.

Figure 3:
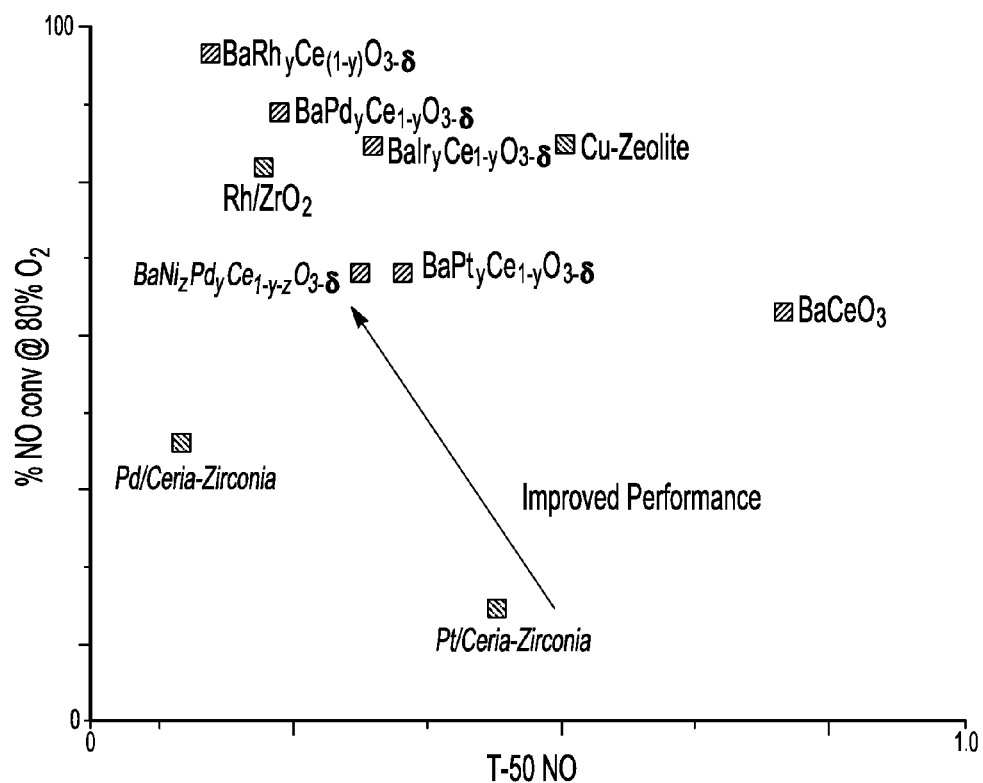
FIG. 3 is a graphical plot illustrating percent NOx conversion in at 80% $O_2$ conversion versus T-50 NOx temperatures for experiments performed on a series of inventive mixed metal oxide three-way catalytic materials.
Figure 4:
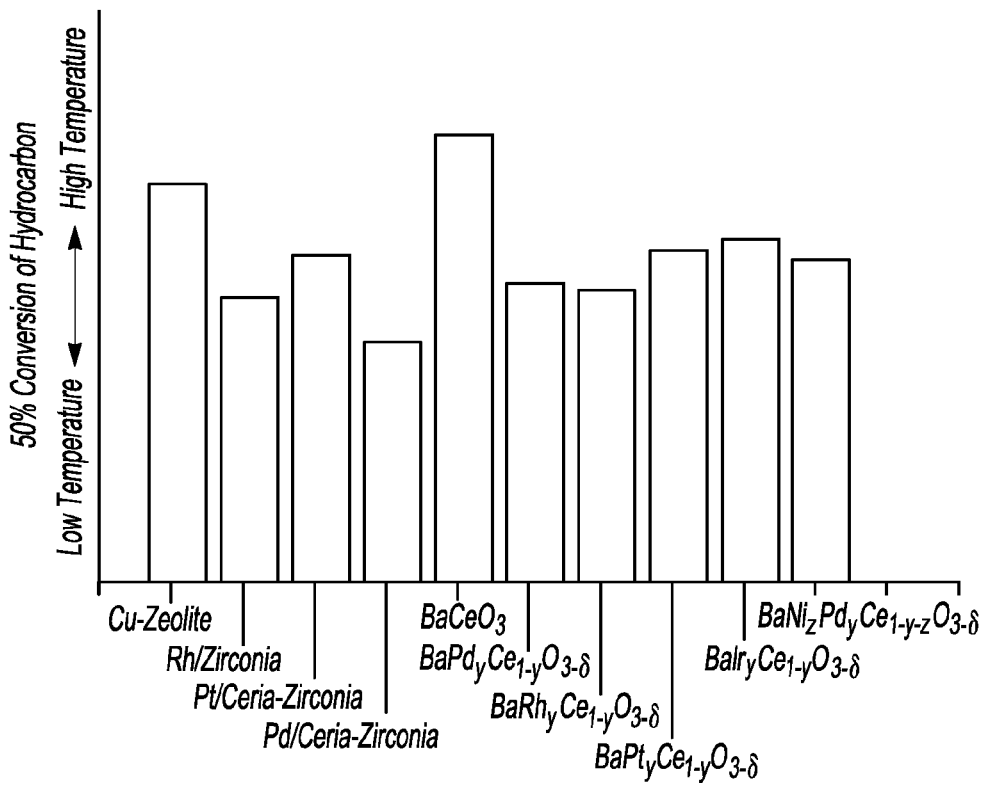
FIG. 4 is a graphical plot illustrating the temperature for 50% conversion of hydrocarbons for a series of inventive mixed metal oxide three-way catalytic materials and known prior art materials.
Figure 5:
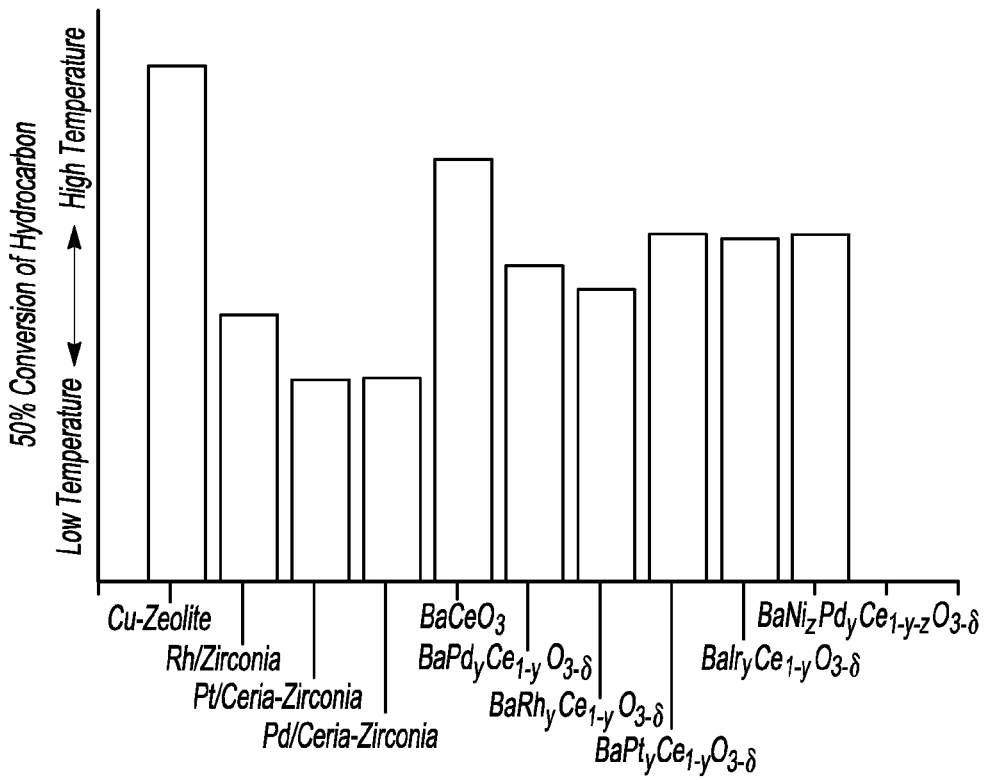
FIG. 5 is a graphical plot illustrating the temperature for 50% conversion of carbon monoxide for a series of inventive mixed metal oxide three-way catalytic materials and known prior art materials.

A summary of test results are illustrated in FIGS. 3-5. In particular, samples of barium cerate doped with Rh, Pd, Ir, Pt and Ni+Pd are shown in comparison to pure barium cerate, an Rh modified zirconia, a copper modified zeolite material, Pd deposited on a ceria-zirconia support, and Pt deposited on a ceria-zirconia support. The results are plotted in FIG. 4 for percent NO conversion at 80% $O_2$ conversion versus T-50 temperature for NO under stoichiometric conditions. It is appreciated that the T-50 temperature refers to the temperature at which 50% of a sample evaporates. In FIG. 5, the results are plotted for the T-50 temperature of hydrocarbon conversion and FIG. 6 shows the T-50 temperature for CO conversion. As indicated by the arrow in FIG. 4, the barium cerate doped with Rh performed the best while the barium cerate doped with Pd was next. Also, the Pd+Ni doped barium cerate sample exhibited improved performance over pure barium cerate, the Pt deposited on ceria-zirconia. Although not shown on the graph, doped barium cerate samples with additions of transition metals iron and cobalt have been produced and are expected to show favorable results.

It is appreciated that the Y axis and X axis in FIG. 4 are normalized to 100% and 1, respectively.

Given the above data, it is appreciated that a barium cerate matrix doped with a precious metal and optionally including one or more transition metals provides a heretofore unknown three-way catalytic material that reduces NOx in an oxidizing atmosphere. Furthermore, the material can be used in a process that oxidizes CO and unburnt HC and yet reduces NOx in anatmosphere containing an oxidant. Therefore, a vehicle using the inventive three-way catalytic material can operate under lean conditions and yet still mitigate NOx emissions allowing operation of the vehicle engine in a regime known for improved fuel economy.

The above teachings, examples, etc. are provided for the purpose of embodying the invention but not limiting its scope in any way. As such, modifications, changes, etc. will be apparent to those skilled in the art that fall within the scope of the invention. Therefore, it is the claims, and all equivalents thereof, that define the scope of the invention.

We claim:

1. A process for reducing NOx while oxidizing other gasses under both reducing and oxidizing atmospheres, the process comprising:
   providing a three-way catalytic material made from a doped barium cerate matrix having a chemical formula of $BaA_yD_zCe_{(1-y-z)}O_{3-\delta}$ where A is a precious metal selected from at least one of the group consisting of Ru, Au, Ag, Pd, Pt, Ir and Rh, and D is a transition metal selected from at least one of the group consisting of Ti, V, Cr, Mn, Fe, Co, Ni, Cu, or Y, y has a value between 0.00 and 0.20, inclusive, and z has a value between 0.0 and 0.20, inclusive;
   providing a combusted fuel plus air atmosphere containing CO, unburnt HC and NOx;
   passing the combusted fuel plus air atmosphere over an outer surface of the three-way catalytic material;
   the outer surface of the three-way catalytic material oxidizing the CO to $CO_2$, oxidizing the unburnt HC to $CO_2$ and $H_2O$ and reducing $NO_x$ to $N_2$ and $O_2$ in the same fuel plus air atmosphere.

2. The process of claim 1, wherein A is selected from at least one of the group consisting of Ru, Au, Ag, Pd, Pt, Ir and Rh.

3. The process of claim 2, wherein A is a combination of Ru, Au, Ag, Pd, Pt, Ir and Rh.

4. The process of claim 1, wherein z has a value between 0.01 and 0.20, inclusive.

5. The process of claim 4, wherein the outer surface of the three-way catalytic material oxidizes CO to $CO_2$ at a plurality of catalytic CO oxidation sites and reduces NOx at a plurality of catalytic NOx reduction sites.

6. The process of claim 5, wherein the combusted fuel plus air atmosphere is an oxidizing atmosphere.

7. A three-way catalytic material for reducing NOx in the presence of an oxidant, the three-way catalytic material comprising:
    a doped barium cerate matrix having a chemical formula of $BaA_yD_zCe_{(1-y-z)}O_{3-\delta}$ where A is a precious metal selected from at least one of the group consisting of Ru, Au, Ag, Pd, Pt, Ir and Rh and D is a transition metal selected from at least one of the group consisting of Ti, V, Cr, Mn, Fe, Co, Ni, Cu, or Y;
    y has a value between 0.01 and 0.20, inclusive;
    z has a value between 0.0 and 0.20, inclusive;
    said doped barium cerate matrix having an outer surface oxidizing CO to $CO_2$, oxidizing unburnt HC to $CO_2$ and $H_2O$ and reducing $NO_x$ to $N_2$ and $O_2$ in a combusted fuel plus air atmosphere containing CO, unburnt HC and $NO_x$.

8. The three-way catalytic material of claim 7, wherein A is selected from at least one of the group consisting of Pd and Rh.

9. The three-way catalytic material of claim 8, wherein A is a combination of Pd plus at least one of Pt, Ir and Rh.

10. The three-way catalytic material of claim 9, wherein z has a value between 0.01 and 0.20, inclusive.

11. The three-way catalytic material of claim 7, wherein said outer surface has a plurality of catalytic CO oxidation sites and a plurality of catalytic NOx reduction sites, said plurality of catalytic NOx reduction sites being at different locations on said outer surface than said plurality of catalytic CO oxidation sites.

12. The three-way catalytic material of claim 7, wherein said outer surface is free of A nanoparticles and D nanoparticles.

\* \* \* \* \*